May 5, 1936. J. A. NAGY 2,039,334
REFRIGERATOR
Original Filed Oct. 5, 1934   2 Sheets-Sheet 1
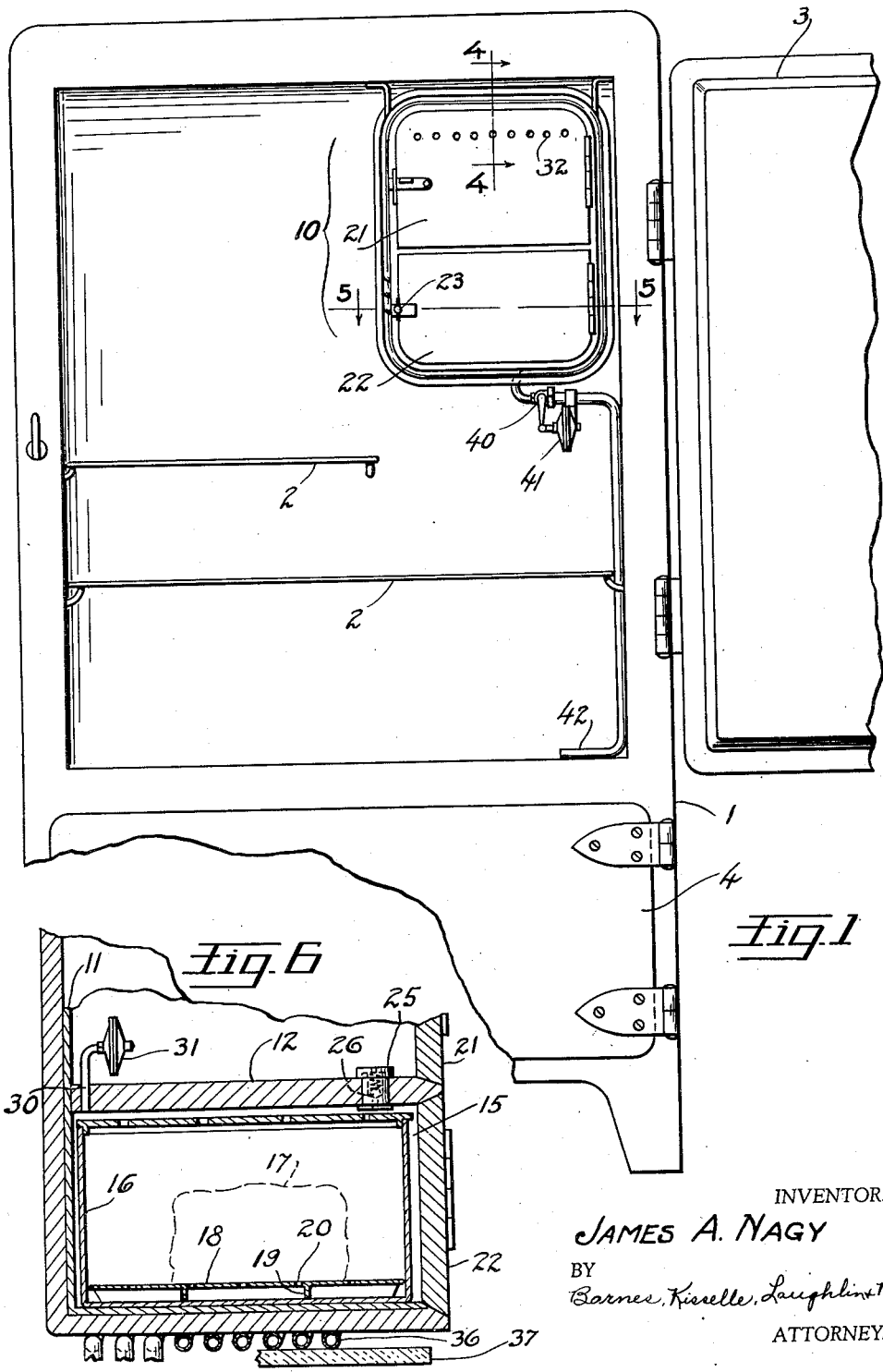
INVENTOR.
JAMES A. NAGY
BY
ATTORNEYS.

May 5, 1936.  J. A. NAGY  2,039,334
REFRIGERATOR
Original Filed Oct. 5, 1934   2 Sheets-Sheet 2
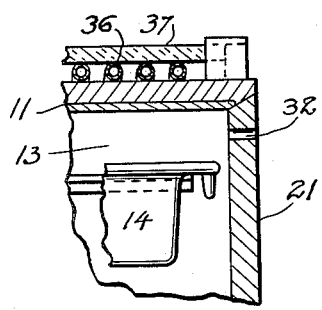
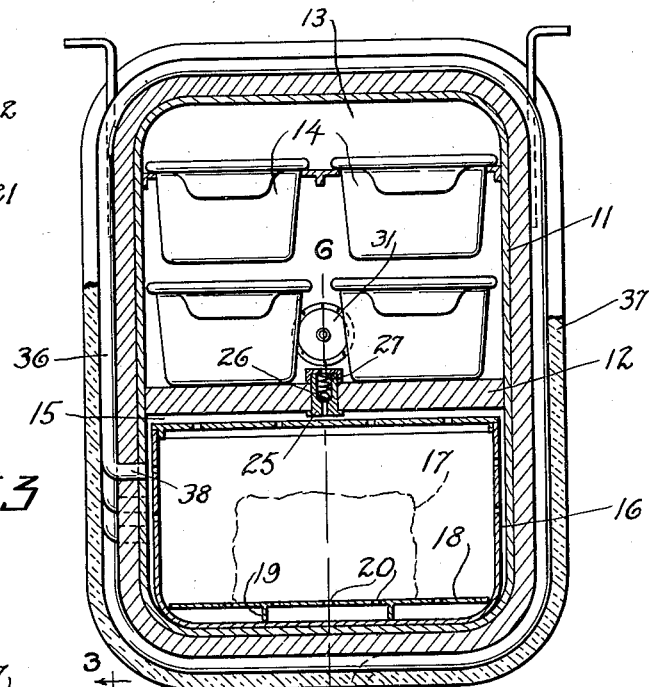
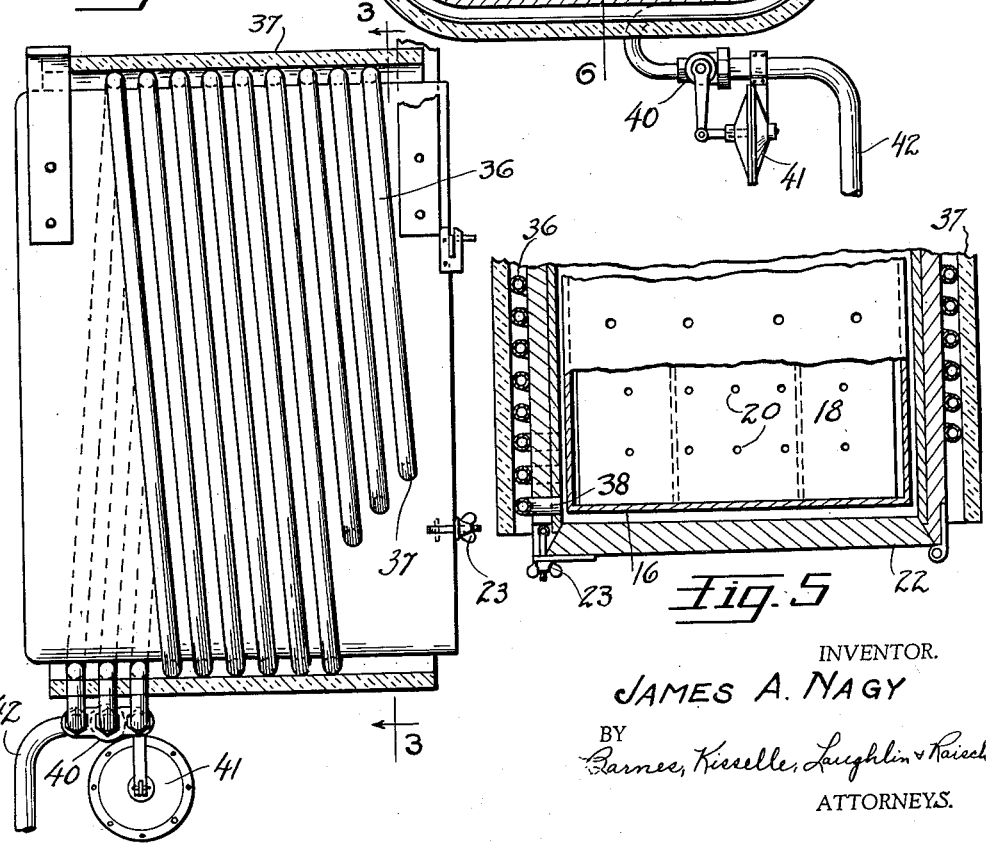
INVENTOR.
JAMES A. NAGY
BY
ATTORNEYS.

Patented May 5, 1936

2,039,334

UNITED STATES PATENT OFFICE 2,039,334

REFRIGERATOR

James A. Nagy, Detroit, Mich., assignor of forty-five per cent to Frederick G. Richardson, Detroit, Mich.

Application October 5, 1934, Serial No. 747,720
Renewed March 6, 1936

9 Claims. (Cl. 62—91.5)

This invention relates to refrigerators and has to do particularly with a refrigerating apparatus for using solid carbon dioxide as the refrigerating medium. The apparatus includes an enclosed compartment for material to be refrigerated, such as for example, a more or less conventional refrigerator cabinet, and also contemplates sharp freezing chambers wherein water or food stuffs to be consumed in frozen form may be placed to be frozen. It is, of course, necessary in refrigerating ordinary food stuffs that a desirable refrigerating temperature be maintained, as for example from 40 to 45° F., and undesirable that the temperature in the food compartment be reduced to a point below freezing. The temperature of solid carbon dioxide is so low that provision must be made to insure a proper temperature in the food compartment of the refrigerator. The present invention contemplates a structure wherein the temperature of the food compartment may be maintained thermostatically and at the same time a lower temperature maintained in a sharp freezing chamber. As the solid carbon dioxide changes into a gas, considerable pressure may develop and a control is effected by the apparatus herein which functions both from the temperature and the pressure.

This application is a continuation in part of my prior application Serial No. 661,698 filed March 20, 1933.

Fig. 1 is a view of a refrigerator constructed in accordance with the invention showing a cabinet equipped with the apparatus of the invention.

Fig. 2 is an enlarged detailed view showing some of the structure of the controlling unit.

Fig. 3 is an enlarged view largely in cross-section showing the cooling unit.

Fig. 4 is an enlarged sectional view taken substantially on line 4—4 of Fig. 1.

Fig. 5 is an enlarged sectional view taken substantially on line 5—5 of Fig. 1.

Fig. 6 is a sectional view through the cooling unit taken substantially on line 6—6 of Fig. 3.

The invention may be employed with a cabinet 1 of usual construction having shelves 2 for food stuffs, and a door 3. The lower part of the cabinet may have a separate storage compartment closable by a door 4. The cooling unit is generally shown at 10 in Fig. 1.

This unit advantageously comprises a shell 11 divided into separate compartments by a partition 12 so that the compartments are sealed off from each other. One compartment 13 may be for the reception of trays 14 in which water may be placed to be frozen, or other substances such as frozen food stuffs or the like may be placed in the compartment to be frozen. The other compartment is shown at 15, and this compartment is for the reception of one or more blocks of solid carbon dioxide. As shown in Fig. 3, compartment 13 is above compartment 15, but it is immaterial which compartment is placed above the other. A suitable receptacle 16 may be placed in the compartment 15 for receiving a block of solid carbon dioxide as at 17. Preferably, the block of solid carbon dioxide is disposed upon a support 18 having feet or legs 19 to more or less insulate the same from the walls of the compartment and to provide for flow of gas therearound. The support 18 may be of foraminous material or a plate provided with apertures 20. The receptacle 16 may be closed and some of its walls are provided with apertures 20.

There may be a door 21 for closing the compartment 13. A door 22 is provided for the compartment 15, and this door is preferably sealed tightly to hold the carbon dioxide gas, and it may be held closed in any suitable manner, as for example by a wing nut on a threaded bolt or pin as shown at 23.

The compartments 13 and 15 are connected by controlling valve means. One of these valves is a pressure valve as shown at 25, and it may take any conventional structure, as for example a ball 26 held closed over the valve port by a spring 27. Another valve is shown at 30 in the partition 12, and this valve is controlled to be opened and closed by a suitable thermostat 31 positioned in the compartment 13. The door 21 may be provided with a suitable number of apertures 32 for the discharge of carbon dioxide gas therefrom.

Surrounding the shell 11 and preferably insulated therefrom by insulation 35 is a plurality of coiled tubes 36. These tubes are preferably covered by insulation 37. These three tubes are arranged in parallel, and each connects at one end into the chamber 15, as shown at 38. The opposite ends of the tubes connect into a valve 40, controlled to be opened and closed by a thermostat 41. Leading from the valve 40 is a discharge pipe 42 which advantageously may be extended to a point near the bottom of the food compartment.

In operation, a body of solid carbon dioxide is placed in the receptacle 16 and the compartment 15 is closed and sealed by the door 22. As the solid carbon dioxide gasifies, the gas escapes through the apertures 20 into the space 15. The pressure valve 25 is arranged to maintain a desirable pressure in the chamber 15, so that the gas escapes therefrom only when such pressure is attained. The gas passes into the chamber 13 and the chamber is chilled sufficiently for the desired rapid freezing of ice or food stuffs to be frozen. If the temperature in the compartment 13 is unduly high, as it may be when pans of water or relatively warm food stuffs to be frozen are placed therein, the valve 30 is opened by the thermostat 31, thus allowing a greater flow of carbon dioxide gas into the chamber 13 to accelerate cooling of the compartment and freezing of the substance therein.

Accordingly, the solid carbon dioxide first refrigerates and cools the sharp freezing chamber constituted by the compartment 13. The gas may escape through the apertures 32 and thus flow into the main food compartment of the refrigerator to thus cool the same. The pressure valve, however, aids in determining the amount of gas flowing into the sharp freezing chamber and the food compartment. The gases escaping into the compartment 15 have access to the tubes 36 and cannot flow therethrough when valve 40 is closed. If the food compartment becomes unduly warm, this valve is opened by the thermostat 31 so that the gases theretofore held under pressure in the compartment 15 may freely flow, except for resistance to flow later to be pointed out, through the coils 36 discharging through the open end of the tube 42, thus more rapidly cooling the food compartment. When the temperature of the food compartment has been sufficiently lowered then valve 40 closes, thus cutting off this relatively free flow of carbon dioxide gas into the food compartment and returning to the more or less normal condition of the gas held under pressure in compartment 15, flowing under control of the pressure valve into the sharp freezing chamber and escaping into the food compartment through the apertures 32.

It is desirable, however, to more or less control the flow of carbon dioxide gas through the tubes 36 into the food compartment, so that the compartment will not be too rapidly chilled, and particularly so that food stuffs placed in close proximity to the outlet end of the tube 42 are not unduly chilled or frozen as the gas impinges thereupon. Accordingly, the coils 36 are of such size and length as to set up sufficient friction or resistance to the flow to obtain the desired flow of gases therethrough. To this end it has been found that a plurality of tubes (each in a coil as at 36) may be used in parallel serving to set up the desired resistance and also serving to surround and chill the sharp freezing chamber.

In the form shown herein three of such tubes are illustrated, although it is within the invention to vary this number. Also, the number of tubes may be varied with tubes of different diameters. It has been found that three tubes used in the coil 36 and connected in parallel, each of which was about 64 feet long with an inside diameter of ⅛ of an inch, provides a satisfactory arrangement. In this arrangement the outlet tube 42 had an inside diameter of about ¼ of an inch.

In this manner the evaporation of the solid carbon dioxide is restrained sufficiently by the pressure valve to give a normal satisfactory operation to efficiently chill the sharp freezing chamber and to refrigerate the food compartment. The thermostatically controlled valve 30 provides for quickly chilling the sharp freezing chamber when it is warm. Likewise, the thermostatically controlled valve 40 functions to admit a relatively large supply of carbon dioxide gas into the food compartment when it becomes unduly warm. When either one of the thermostatic valves is opened, the pressure of the solid carbon dioxide is relieved and evaporation takes place more rapidly. At the same time the resistance coils 36 serve to prevent a sudden large supply of carbon dioxide gas entering the food compartment which might damage some of the food stuffs therein.

I claim:

1. A refrigerator comprising, a cabinet having a food compartment, a refrigerating unit comprising a substantially sealed compartment for solid carbon dioxide, a sharp freezing chamber, a pressure valve connecting the compartment and sharp freezing chamber for maintaining pressure in the compartment and for permitting flow of carbon dioxide gas into the sharp freezing chamber, tubes resistant to unrestricted gas flow connecting into the carbon dioxide compartment having outlet means into the food compartment, and a thermostatically controlled valve for said outlet means.

2. A refrigerator comprising, a cabinet having a food compartment, a refrigerating unit in the cabinet comprising a substantially sealed compartment for solid carbon dioxide, a sharp freezing chamber, a pressure valve connecting the compartment and sharp freezing chamber for maintaining the gases in the compartment under pressure and for allowing flow of gases into the sharp freezing temperature upon the attaining of sufficient pressure, a thermostatically controlled valve connecting the carbon dioxide compartment with the sharp freezing chamber, a tube resistant to unrestricted gas flow connecting into the carbon dioxide compartment and having outlet means for carbon dioxide gas into the food compartment, and a thermostatically controlled valve for said outlet means.

3. A refrigerator comprising, a cabinet having a food compartment, a refrigerating unit in the cabinet comprising a substantially sealed compartment for solid carbon dioxide, a sharp freezing chamber, a pressure valve connecting the carbon dioxide compartment and sharp freezing chamber for maintaining pressure on the carbon dioxide in the compartment and for allowing flow of carbon dioxide gas into the sharp freezing chamber upon the attaining of sufficient pressure, another valve connecting the carbon dioxide compartment and the sharp freezing chamber, thermostatic control means positioned in the sharp freezing chamber for controlling the opening and closing of a second mentioned valve, a tube resistant to unrestricted gas flow connecting into the carbon dioxide compartment and having outlet means to the food compartment, and a thermostatic control valve for said outlet means.

4. A refrigerator comprising, a cabinet having a food compartment, a refrigerating unit in the cabinet comprising a substantially sealed compartment for solid carbon dioxide, a sharp freezing chamber, a pressure valve connecting the carbon dioxide compartment and sharp freezing chamber for maintaining pressure on the carbon dioxide in the compartment and for allowing flow of carbon dioxide gas into the sharp freezing chamber upon the attaining of a given pressure, another valve connecting the carbon dioxide compartment and the sharp freezing chamber, thermostatic control means positioned in the sharp freezing chamber for controlling the opening and closing of a second mentioned valve, a plurality of tubes resistant to unrestricted gas flow connecting into the carbon dioxide compartment, outlet means for said tubes connecting into the food compartment, said tubes being arranged in parallel between the carbon dioxide compartment and the outlet means, a valve for the outlet means, and thermostatic control means for the valve located in the food compartment.

5. A refrigerator comprising, a cabinet having a food compartment, a refrigerating unit in the cabinet comprising a substantially sealed compartment for solid carbon dioxide, a sharp freezing chamber, a pressure valve connecting the carbon dioxide compartment and sharp freezing chamber for maintaining pressure on the carbon dioxide in the compartment and for allowing flow of carbon dioxide gas into the sharp freezing chamber upon the attaining of a given pressure, another valve connecting the carbon dioxide compartment and the sharp freezing chamber, thermostatic control means positioned in the sharp freezing chamber for controlling the opening and closing of the second mentioned valve, a plurality of tubes resistant to unrestricted gas flow connecting into the carbon dioxide compartment, outlet means for said tubes connecting into the food compartment, said tubes being arranged in parallel between the carbon dioxide compartment and the outlet means, a valve for the outlet means, and thermostatic control means for the valve located in the food compartment, said outlet means comprising a tube opening into the food compartment near the bottom thereof.

6. A refrigerator comprising, a cabinet having a food compartment, a refrigerating unit comprising a shell, a partition dividing the shell into a compartment for solid carbon dioxide and a sharp freezing chamber, a door for the carbon dioxide compartment for substantially sealing the same, a pressure valve in the partition for maintaining carbon dioxide gas under pressure in the compartment and for the flow of carbon dioxide gas into the sharp freezing chamber upon the attaining of a given pressure, a second valve in said partition, thermostatic control means located in the sharp freezing chamber for controlling the opening and closing of the second valve, said sharp freezing chamber being in communication with the food compartment, a plurality of tubes resistant to unrestricted gas flow coiled around the refrigerating unit, each connected at one end to the carbon dioxide compartment, outlet means for said tubes for the flow of gas therefrom into the food compartment, a valve for controlling the outlet means, and thermostatic means positioned in the food compartment for controlling the opening and closing of the last mentioned valve.

7. A refrigerator comprising, a cabinet having a food compartment, a refrigerating unit comprising a shell, a partition dividing the shell into a compartment for solid carbon dioxide and a sharp freezing chamber, a door for the carbon dioxide compartment for substantially sealing the same, a pressure valve in the partition for maintaining carbon dioxide gas under pressure in the compartment and for the flow of carbon dioxide gas into the sharp freezing chamber upon the attaining of a given pressure, a second valve in said partition, thermostatic control means located in the sharp freezing chamber for controlling the opening and closing of the second valve, said sharp freezing chamber being in communication with the food compartment, a plurality of tubes resistant to unrestricted gas flow coiled around the refrigerating unit, each connected at one end to the carbon dioxide compartment, outlet means for said tubes for the flow of gas therefrom into the food compartment, a valve for controlling the outlet means, and thermostatic means positioned in the food compartment for controlling the opening and closing of the last mentioned valve, said plurality of resistance tubes arranged in parallel between the carbon dioxide compartment and the outlet means.

8. A refrigerator comprising, a cabinet having a food compartment, a refrigerating unit in the cabinet having a shell, a partition in the shell dividing the same into a compartment for solid carbon dioxide and a sharp freezing chamber, a door for closing and substantially sealing the compartment for solid carbon dioxide, a thermostatically controlled valve for governing the flow of carbon dioxide gas from the said compartment into the sharp freezing chamber, a door for the sharp freezing chamber provided with one or more openings leading into the food compartment, a tube resistant to unrestricted gas flow connecting into the carbon dioxide compartment and having outlet means leading into the food compartment, a valve for controlling the outlet means, and thermostatic means positioned in the food compartment for opening and closing said last named valve.

9. A refrigerator comprising, a cabinet having a food compartment, a refrigerating unit in the cabinet comprising a shell divided into a compartment for a solid carbon dioxide and a sharp freezing chamber, a door for substantially sealing the carbon dioxide compartment, a pressure valve and a thermostatically controlled valve for connecting the carbon dioxide compartment and the sharp freezing chamber, said sharp freezing chamber being in gaseous connection with the food compartment, a plurality of tubes resistant to unrestricted gas flow, each connecting at one end into the carbon dioxide compartment and around the shell, insulating means between the shell and the coils, insulating means over the coils, outlet means for the resistance tubes connecting into the food compartment, said resistance tubes being connected in parallel between the carbon dioxide compartment and the outlet means, a valve for controlling the outlet means, and thermostatic means positioned in the food compartment for opening and closing said last named valve.

JAMES A. NAGY.